UNITED STATES PATENT OFFICE.

DAVID MILES, OF KINGSTON, PENNSYLVANIA, ASSIGNOR TO HIMSELF AND WILLIAM H. SQUAREY, OF SAME PLACE.

IMPROVEMENT IN FLUXES FOR WELDING IRON AND STEEL.

Specification forming part of Letters Patent No. 165,246, dated July 6, 1875; application filed March 26, 1874.

*To all whom it may concern:*

Be it known that I, DAVID MILES, of Kingston, in the county of Luzerne and State of Pennsylvania, have invented an Improved Flux for Welding Iron and Steel, of which the following is a specification:

This invention relates to the welding of steel to steel or iron to steel; and consists in the use for such purpose, as a flux, of what is known as "slag," and which is the refuse and melted substance that runs from furnaces employed in the manufacture of wrought-iron, either hammered or rolled.

Said flux may be used with advantage for welding and working all kinds of steel, including old steel rails, frog-steel, spring-steel, and tool-steel, or for welding iron to steel of any kind. Not only is its cost trifling or merely nominal, as compared with the fluxes ordinarily used for like purposes, but it improves the quality and toughness of the steel, and a much higher heat is attainable without burning the metal.

The action of said flux after putting it on the heated metal is to melt like adhesive wax, and, for convenience and to expedite its melting, it is desirable to pulverize the slag and use it in such form, especially for small work; but it may be used in lumps or larger pieces for heavier work.

In using slag as a flux for welding in an ordinary smith's forge, it is applied in the same way as any other flux; but the metal to be welded or worked may, as hereinbefore observed, be much more highly heated without burning or spoiling it. Likewise, in using the flux for furnaces, to weld together scrap or other steel to be drawn out into hammered ingots or blooms or forgings of any given shape, the process is the same as that pursued in producing similar work in iron from scrap, and which, being well understood, it is not necessary here to describe; but it may be observed that it is advisable to put a good supply of the flux on the pile to be worked, and between the scraps thereof, then to place the whole in the furnace and to bring the pile or pieces to be worked and welded to a good welding heat, taking care that the pile is evenly heated, and that there is sufficient flux placed on the pile to extend to the parts to be welded, after which the mass is removed from the furnace to the hammer.

What I claim as my invention, and desire to secure by Letters Patent, is—

A flux for welding and working iron and steel, made of slag, substantially as described.

DAVID MILES.

Witnesses:
W. S. PARSONS,
W. H. SQUAREY.